United States Patent [19]
Kemner

[11] 3,746,364
[45] July 17, 1973

[54] MULTIPOSITION STABILIZER WITH A PLURALITY OF WEAR SURFACES

[75] Inventor: Mark H. Kemner, Park Forest, Ill.
[73] Assignee: Mark H. Kemner, Milwaukee, Wis.
[22] Filed: Mar. 1, 1972
[21] Appl. No.: 230,780

[52] U.S. Cl............................................ 280/150 C
[51] Int. Cl. ........................................... B60r 27/00
[58] Field of Search .................. 280/150 C, 150 R, 280/46, 43.12

[56] References Cited
UNITED STATES PATENTS
3,202,233 8/1965 Dolphin ......................... 280/43.12
947,112 1/1910 Love .............................. 280/150 C Primary Examiner—Benjamin Hersh
Assistant Examiner—Robert R. Song
Attorney—Charles L. Schwab et al.

[57] ABSTRACT

A pair of multiposition stabilizer disks are secured at the laterally opposite sides of the front of a low lift walkie truck to stabilize the truck by abutting the ground when the truck is tipped as when making a sharp turn.

3 Claims, 4 Drawing Figures

MULTIPOSITION STABILIZER WITH A PLURALITY OF WEAR SURFACES

BACKGROUND OF THE INVENTION

The low lift walkie truck, to which the present invention relates, has a steerable wheel at its front end located approximately in the longitudinal central vertical plane of the truck and a pair of laterally spaced load wheels at the rear end of the truck, thus the low lift walkie truck is a tricycle-type vehicle. In order to stabilize this type truck it has heretofore been proposed to use outriggers extending in laterally opposite directions to points on opposite sides of the steerable wheel. It has also been proposed, heretofore, to use wheels rotatably mounted on the frame at opposite sides of the steerable wheel.

BRIEF DESCRIPTION OF THE INVENTION

The present invention includes the provision of an adjustably positionable stabilizing disk at laterally opposite sides of the truck frame at the front of the walkie lift truck which has a plurality of wear surfaces which are selectively positioned in engageable relation to the ground. The disk is releasably fastened to the frame and may be repositioned upon a predetermined wear occurring to the portion of the stabilizing disk confronting the ground. This means of stabilizing a low lift walkie truck is considerably less expensive than devices heretofore employed. The provision of multiple wear surfaces and means to readily reposition the stabilizing disk permits maximum utilization of the disk and minimum replacement of the stabilizing means.

DETAILED DESCRIPTION OF THE INVENTION

Figure 1:
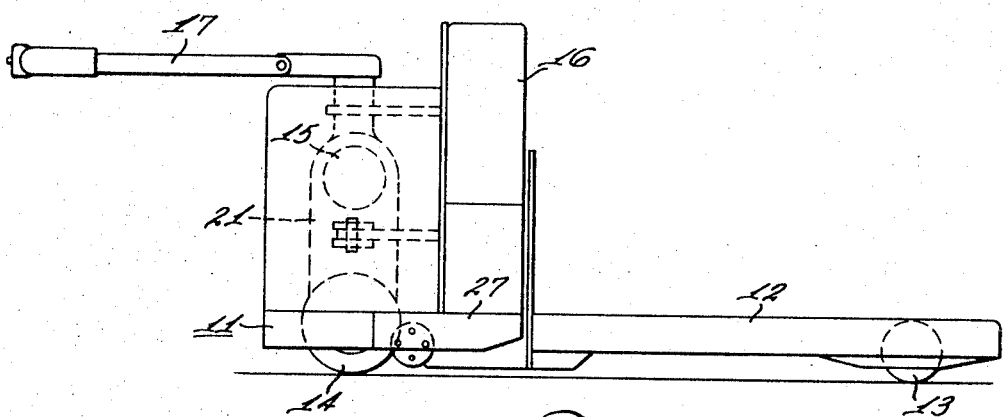
FIG. 1 is a side view of a low lift walkie truck incorporating the present invention.
Figure 2:
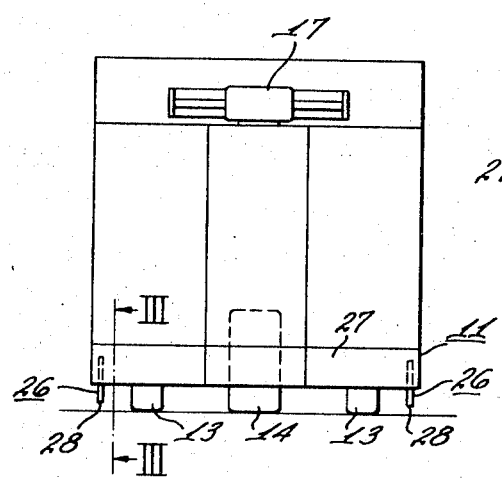
FIG. 2 is a front end view of the truck shown in FIG. 1.

Referring to FIGS. 1 and 2, the low lift walkie truck in which the present invention is incorporated includes a frame 11, a load support attachment 12 having a pair of load wheels 13 at the rear end thereof. The frame 11 supports a drive unit 21 which includes a steerable drive wheel 14, and a control handle 17. The steerable drive wheel 14 is steered by horizontal swinging movement of the control handle 17. The drive wheel 14 is driven by a motor 15 suitably connected to a battery 16. The truck is basically a tricycle vehicle which in normal operation is supported on its drive and load wheels 14, 13.

Inasmuch as the three wheel low lift walkie truck is power driven it may, under certain circumstances, be tipped about the rear drive wheel 14 and one of the load wheels 13 particularly upon its being steered at a sharp angle at some predetermined speed. In order to stabilize the truck against such tipping there is provided, at laterally opposite sides of the truck, a pair of stabilizing members in the form of circular disks 26. The circular disks 26 are fastened to a wrap-around bumper part 27 of the frame 11, thus positioning the stabilizing disks at fairly wide lateral spacing from the steerable wheel 14. Each of the disks 26 has a peripheral surface or portion 28 which will engage the ground if the lift truck is tipped downwardly on the lateral side on which the disk is located.

Figure 3:
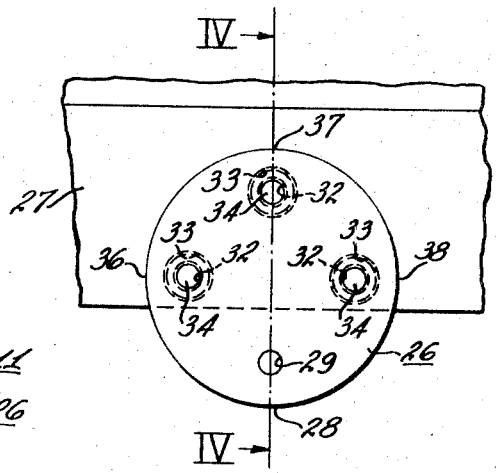
FIG. 3 is a side view on the line III—III of FIG. 2.
Figure 4:
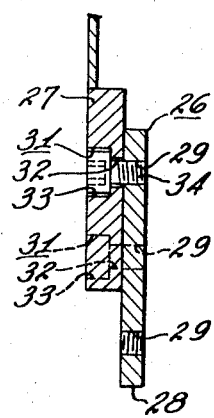
FIG. 4 is a section view on the line IV—IV in FIG. 3.

Referring also to FIGS. 3 and 4, each disk 26 includes four threaded openings 29 disposed in circumferentially spaced relation to one another. The bumper part of the frame at each side of the front of the truck is provided with three openings 31, each formed with a bore 32 and a counterbore 33. Any circumferentially consecutive series of three holes of the stabilizer disk 26 may be brought into registration with the three openings 31 of the frame and in such condition three tension members in the form of Allen head cap screws 34 are threadedly engaged with the threaded openings 29. The head of the cap screws 34 are disposed in the counterbores 33 thus providing a flush outer surface for the bumper part 27 of frame 11.

When the portion 28 of the disk 26 becomes excessively worn, the cap screws 34 are removed and the disk rotated to bring one of the other peripheral wear portions 36, 37, 38 into a ground confronting position. The cap screws 34 are reinstalled to rigidly secure the disk 26 to the bumper part 27. This adjustably positioned stabilizing disk provides considerably greater wear life to be obtained from the disk and is considerably less expensive than wheels or outriggers as heretofore suggested by others.

I claim:

1. In a lift truck of the type having a frame, a steerable wheel at the forward end of said frame and laterally spaced load wheels at the rear of said truck coacting with said steerable wheel for supporting said truck for normal movement on said wheels, stabilizing means comprising:

a pair of laterally spaced and vertically disposed plates having parts thereof extending downwardly from said frame on laterally opposite sides of said forward end of said truck, each having a plurality of adjusted positions relative to said frame wherein different peripheral wear portions of said plate are brought into confronting relation with the ground, and fastening means releasably securing said plates rigidly to said frame in any of said positions whereby the respective lowermost peripheral wear portions of said plates are slightly above the ground when the truck is in its normal stable position, one or the other of said plates engaging the ground to stabilize said truck upon tipping about said steerable wheel and one or the other of said load wheels.

2. The structure of claim 1 wherein said plates are circular disks having axial openings facilitating selective fastening of said disk to said frame in said adjusted positions.

3. The structure of claim 2 wherein said disks each have at least three circumferentially spaced openings and said frame has openings registering with two of said openings of each of said disks and wherein said fastening means includes a pair of threaded tension elements disposed in said registering openings.

* * * * *

PO-1050
(5/69)

UNITED STATES PATENT OFFICE
CERTIFICATE OF CORRECTION

Patent No. 3,746,364      Dated July 17, 1973

Inventor(s) Mark H. Kemner

It is certified that error appears in the above-identified patent and that said Letters Patent are hereby corrected as shown below:

On the Cover Sheet, "[73] Assignee: Mark H. Kemner, Milwaukee, Wis." should read --- [73] Assignee: Allis-Chalmers Corporation, Milwaukee, Wis. ---.

Signed and sealed this 27th day of November 1973.

(SEAL)
Attest:

EDWARD M. FLETCHER, JR.
Attesting Officer

RENE D. TEGTMEYER
Acting Commissioner of Patents